US012000558B1

(12) United States Patent
Jun

(10) Patent No.: US 12,000,558 B1
(45) Date of Patent: Jun. 4, 2024

(54) LENS ASSEMBLY

(71) Applicant: HYUNDAI MOBIS CO., LTD., Seoul (KR)

(72) Inventor: Young Geun Jun, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/496,971

(22) Filed: Oct. 30, 2023

(30) Foreign Application Priority Data

Dec. 15, 2022 (KR) ........................ 10-2022-0175385

(51) Int. Cl.
*F21S 41/63* (2018.01)
*F21S 41/20* (2018.01)

(52) U.S. Cl.
CPC ........... *F21S 41/635* (2018.01); *F21S 41/285* (2018.01)

(58) Field of Classification Search
CPC ...................................................... F21S 41/285
See application file for complete search history.

(56) References Cited

U.S. PATENT DOCUMENTS

| | | | | |
|---|---|---|---|---|
| 5,652,922 A * | 7/1997 | Kohno | G02B 7/10 | 396/348 |
| 9,851,074 B2 * | 12/2017 | Teder | F21V 5/007 | |
| 2004/0165280 A1 * | 8/2004 | Ichino | G02B 7/04 | 359/696 |
| 2004/0190160 A1 * | 9/2004 | Nishimura | G02B 7/102 | 359/699 |
| 2008/0174891 A1 * | 7/2008 | Kudoh | G02B 7/02 | 359/825 |
| 2015/0253534 A1 * | 9/2015 | Kang | G03B 3/10 | 348/335 |
| 2017/0371126 A1 * | 12/2017 | Takehana | G03B 21/142 | |
| 2021/0382375 A1 | 12/2021 | Sesti et al. | | |

* cited by examiner

*Primary Examiner* — Evan P Dzierzynski
(74) *Attorney, Agent, or Firm* — Novo TechIP International PLLC

(57) ABSTRACT

Provided is a lens assembly applied to a head lamp, and the lens assembly may fix each of a plurality of lenses in an appropriate position to maintain an appropriate distance between the light source and the lens, thereby acquiring a resolution required by a high-resolution adaptive driving beam (ADB) lamp.

10 Claims, 14 Drawing Sheets

LENS ASSEMBLY

CROSS-REFERENCE TO RELATED APPLICATIONS

This application claims priority under 35 U.S.C. § 119 to Korean Patent Application No. 10-2022-0175385, filed on Dec. 15, 2022, in the Korean Intellectual Property Office, the disclosure of which is incorporated herein by reference in its entirety.

TECHNICAL FIELD

The following disclosure relates to a lens assembly, and more particularly, to a lens assembly applied to a head lamp.

BACKGROUND

It is more difficult for a driver of a vehicle to secure visibility at night than during the day. The vehicle includes a high beam enabling the driver to secure a faraway visibility. Use of the high beam is restricted because the high beam may cause glare to a driver of a vehicle driving in an opposite direction from the front.

In order to reduce this problem, a head lamp of a vehicle may recently use an adaptive driving beam (ADB) system for the driver to secure faraway visibility even at night.

There are various types of the head lamp (hereafter referred to as an ADB head lamp) using the ADB system, ranging from a low-priced product with a low resolution to a high-priced product with an ultra-high definition (UHD) resolution. The ADB head lamp includes a pixel light emitting diode (LED) including a plurality of segments (in which the segment is the smallest unit of a light emitting element individually driven by one LED chip).

Here, the number of segments in the ADB head lamp may affect a beam angle of the segment. The more segments, the smaller beam angle of an individual segment. Therefore, more lenses may be used in order for the individual segment to have a sharp contrast ratio and not to cause shape distortion.

Accordingly, the plurality of lenses may increase complexity. In order to acquire a higher resolution in a complex structure, there is a need for an assembly structure which can be assembled so that the plurality of lenses are accurately positioned at a designed position with a smaller error.

See, e.g., U.S. Patent Application Publication No. 2021-0382375 A1 (published on Dec. 9, 2021)

SUMMARY

An embodiment of the present disclosure is directed to providing a lens assembly having an assembly structure for fixing a plurality of lenses to maintain an appropriate distance between a light source and the lenses.

In one general aspect, a lens assembly includes: a lens unit including a plurality of lenses arranged along an optical axis of a light source unit having a light source; a cam unit having a cylindrical shape, accommodating the lens unit, and having a through hole in a side surface; a first barrel unit including a first barrel having a cylindrical shape, accommodating the cam unit, and having a fixing hole positioned in a side surface to correspond to the through hole, and a flange positioned at one end of the first barrel and coupled to the light source unit; and a second barrel unit including a second barrel having a cylindrical shape, accommodating the first barrel, and having a moving hole positioned in a side surface, having a set length in an oblique direction, and corresponding to the fixing hole, and a coupling protruding radially from an outer surface of one end of the second barrel.

The lens assembly may further include a front cap coupled to one end of the cam unit to fix one end of the lens unit to the one end of the cam unit.

The lens unit may include a first lens positioned on a seat formed at one open end of the cam unit; a spacer positioned at a seating end formed inside the one open end of the cam unit for the first lens and a second lens to be spaced apart from each other by a set distance; the second lens having one end in contact with the spacer; and a third lens having one end in contact with the other end of the second lens and the other end which is a convex lens surface and exposed to the outside from the other open end of the cam unit.

Three through holes may be equally spaced apart from one another based on a central axis of the cam unit, three fixing holes may be equally spaced apart from one another based on a central axis of the first barrel, and three moving holes may be equally spaced apart from one another based on a central axis of the second barrel.

The central axis of the cam unit, the central axis of the first barrel, and the central axis of the second barrel may respectively coincide with the optical axis.

The fixing hole may be a long hole having a predetermined length in a longitudinal direction of the first barrel, which is a direction parallel to the optical axis.

The moving hole may be inclined obliquely from the side surface of the second barrel while having an angle set between a longitudinal direction of the moving hole and a direction of the central axis of the second barrel.

The through hole, the fixing hole, and the moving hole may be connected to one another by fastening a fixing pin to the through hole, and the cam unit may be moved by a distance of the cam unit in a longitudinal direction that is provided while the fixing pin is moved from the moving hole in the oblique direction.

The pair of couplings may be symmetrically positioned, and each of the couplings may have a coupling hole having a set length in a circumferential direction.

An angle formed between both ends of the moving hole and the central axis of the second barrel may be less than or equal to an angle formed between both ends of the coupling hole and the central axis of the second barrel.

DETAILED DESCRIPTION

Hereinafter, specific embodiments of the present disclosure are described in detail with reference to the drawings.

In addition, when it is decided that the detailed description of the known configuration or function related to the present disclosure may obscure the gist of the present disclosure, the detailed description thereof will be omitted.

Figure 1:
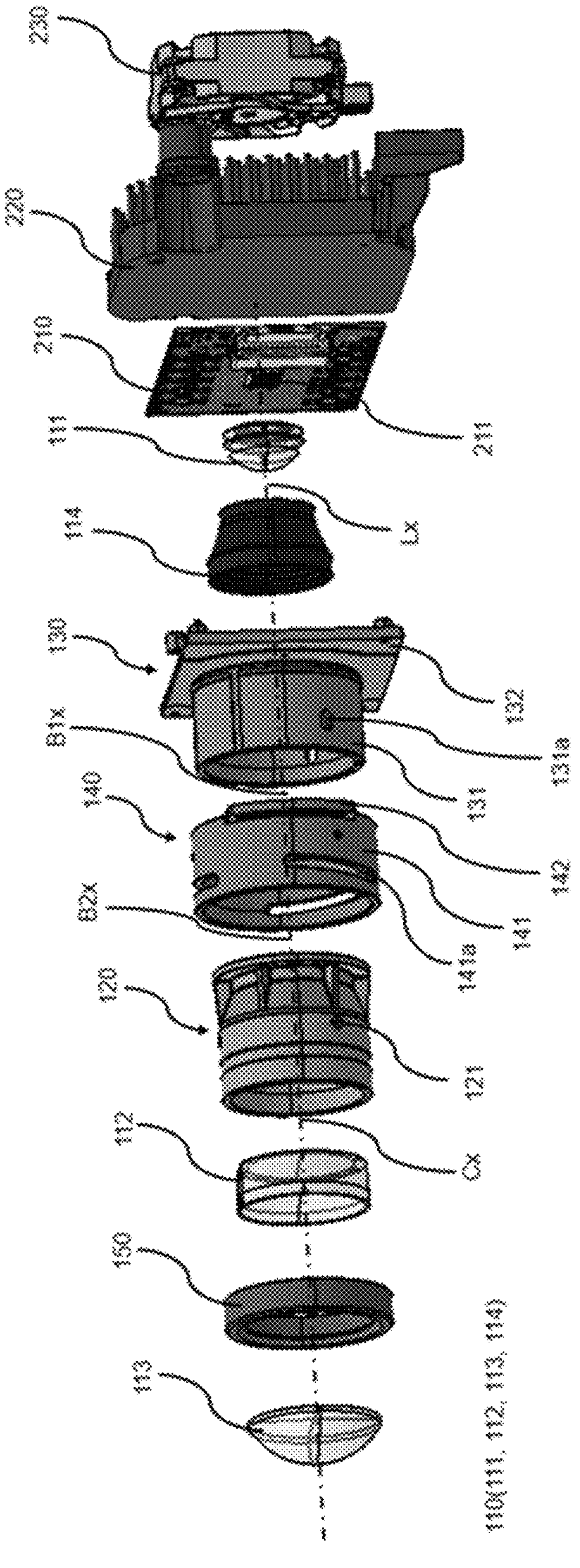
FIG. 1 is an exploded view of a lens module including a lens assembly and a light source unit according to an embodiment of the present disclosure.
Figure 2:
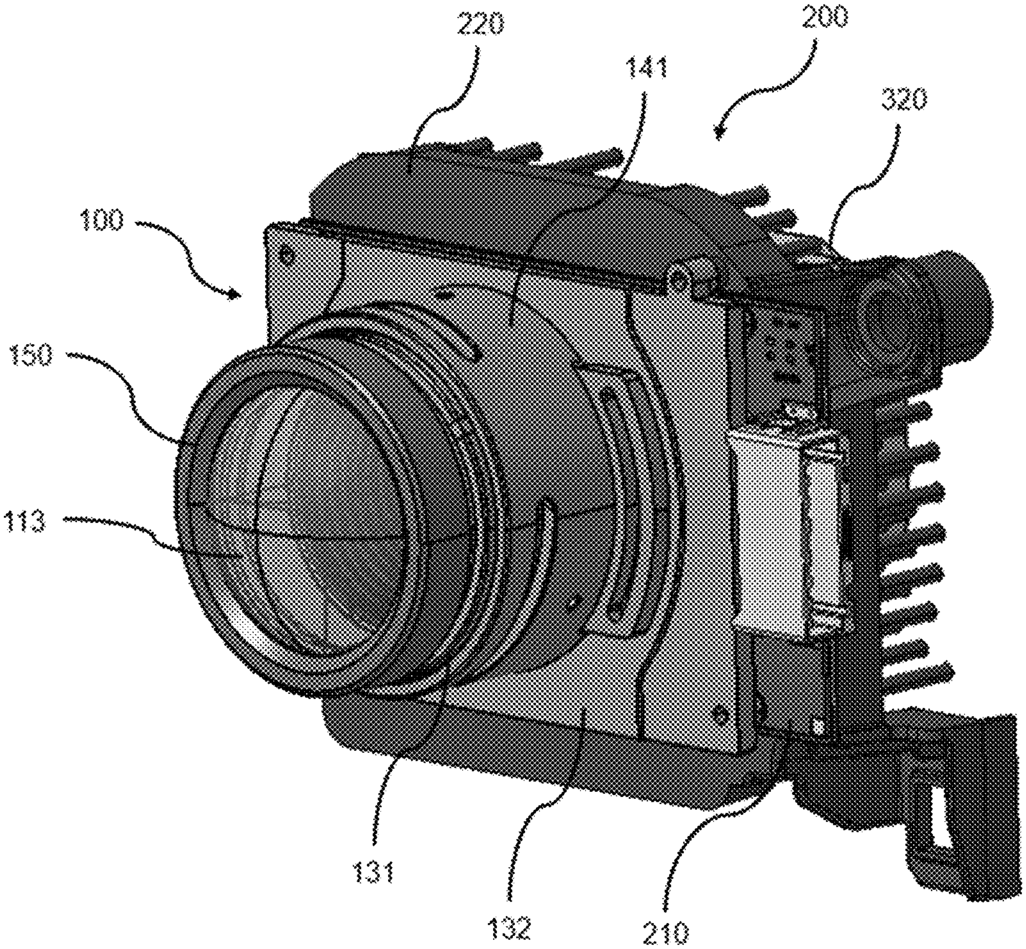
FIG. 2 is a perspective view of the lens module of FIG. 1.

Referring to FIGS. 1 and 2, a lens assembly 100 according to an embodiment of the present disclosure may be coupled to a light source unit 210 having a light source 211 including a light emitting diode (LED). The light source unit 200 may include a light source board 210 including the light source 211, a heat sink 220 coupled to the rear of the light source board 210, and a fan 230 coupled to the rear of the heat sink 220. The heat sink 220 and the fan 230 are components cooling heat from the light source board 210, and detailed descriptions thereof are omitted. The lens assembly 100 may be coupled with the light source unit 210 to configure a lens module.

Figure 3:
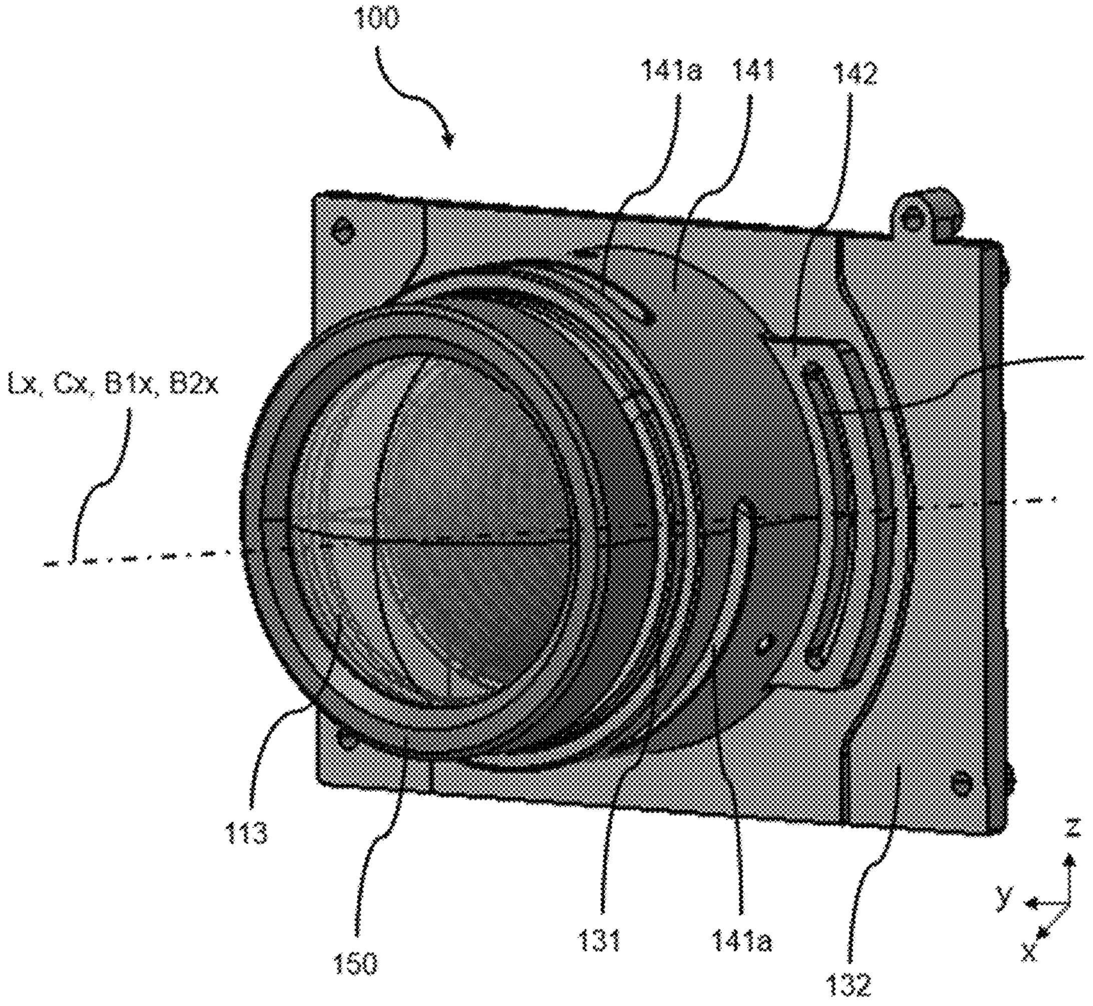
FIG. 3 is a perspective view of the lens assembly according to an embodiment of the present disclosure.
Figure 4:
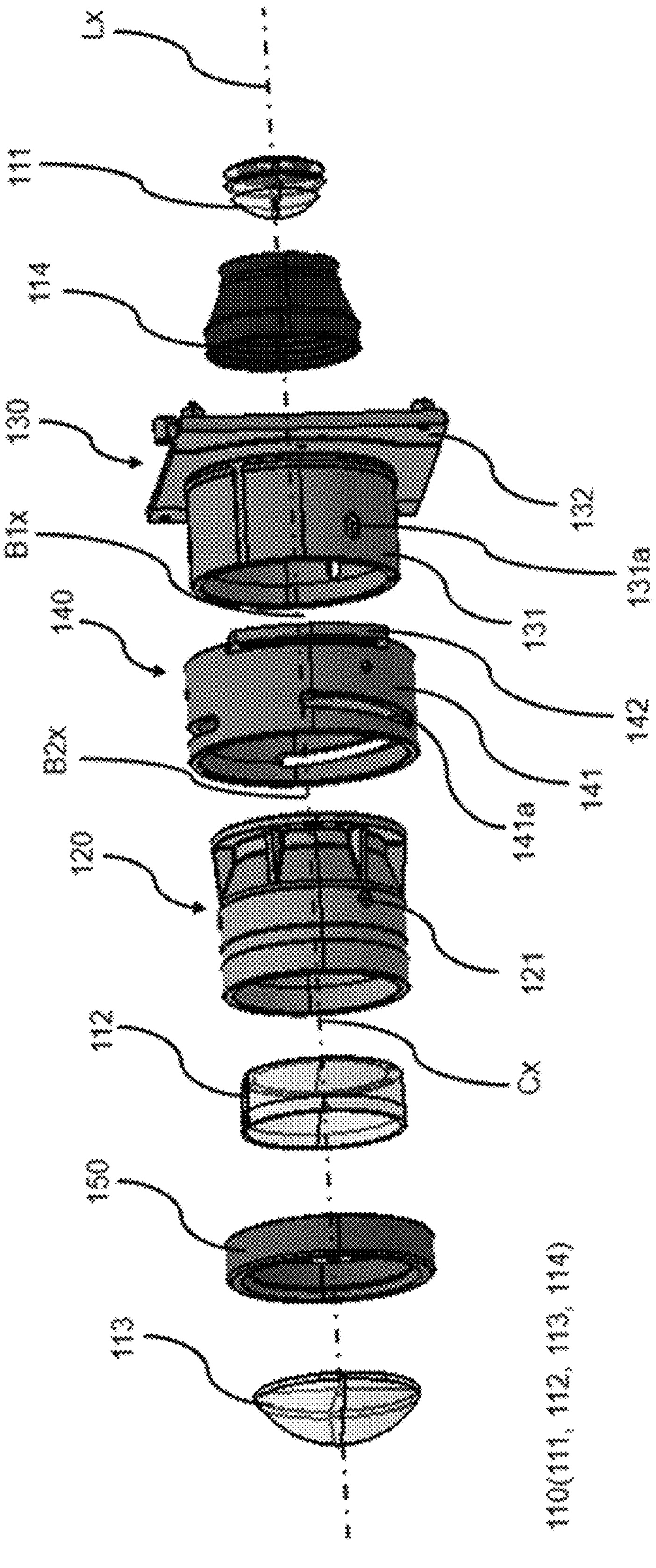
FIG. 4 is an exploded view of the lens assembly according to an embodiment of the present disclosure.
Figure 5:
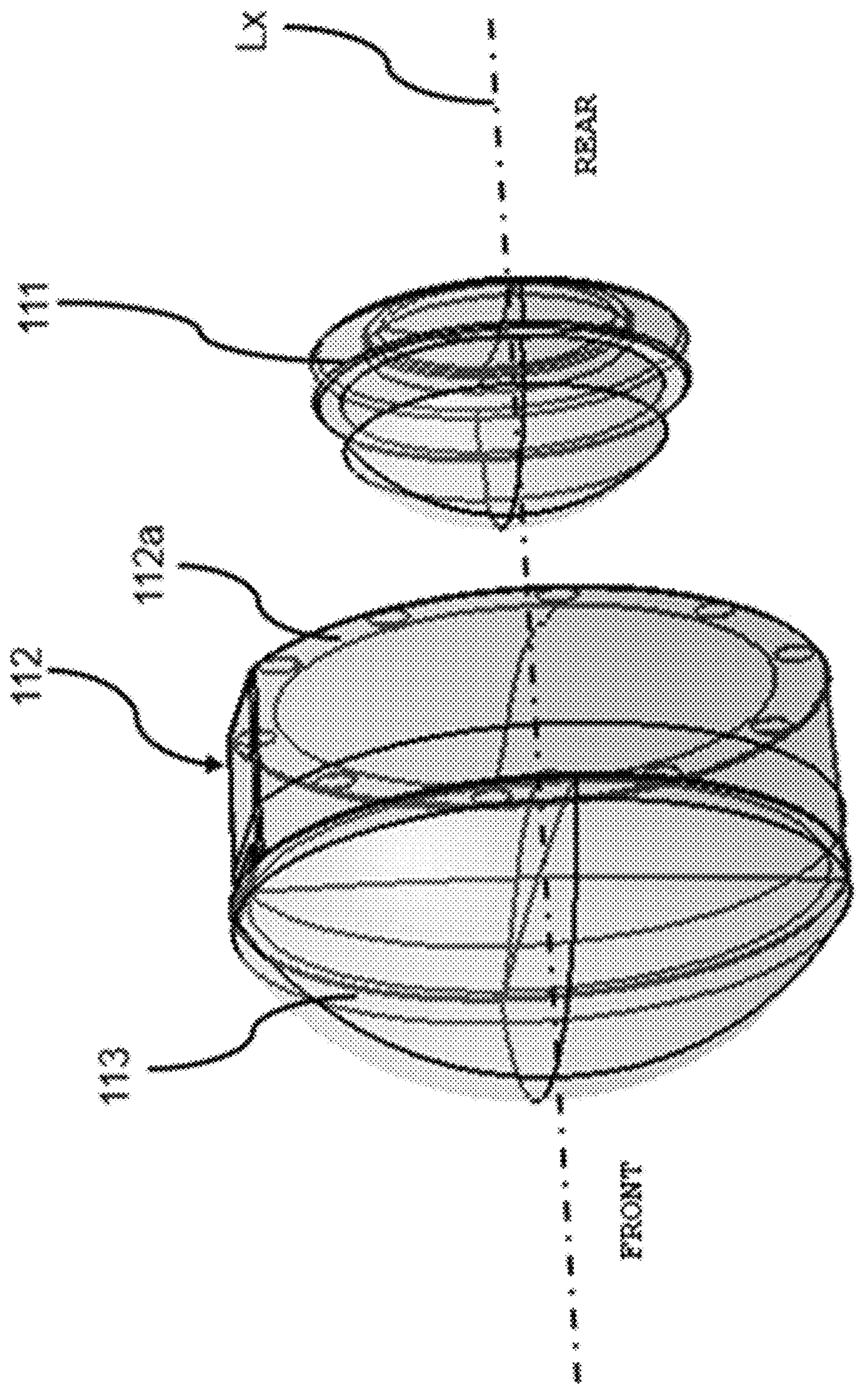
FIG. 5 is a perspective view of a lens unit in the lens assembly according to an embodiment of the present disclosure.
Figure 6B:
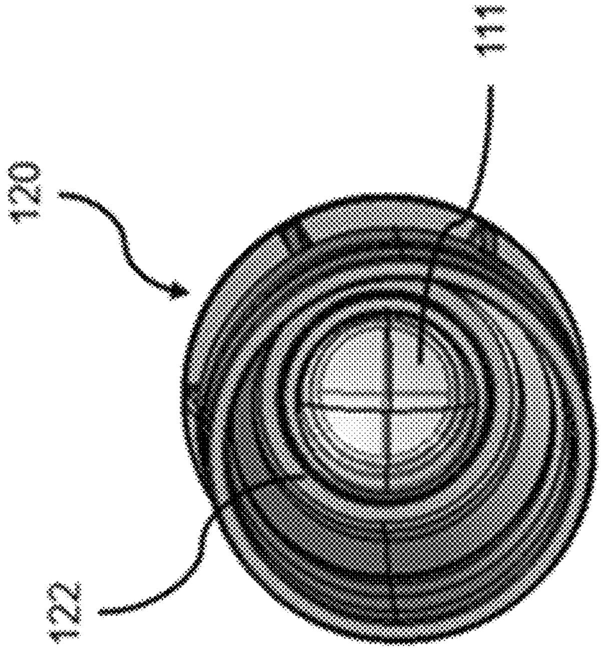
FIGS. 6A to 8D are perspective views of a cam unit and a lens unit in the lens assembly according to an embodiment of the present disclosure.
Figure 6A:
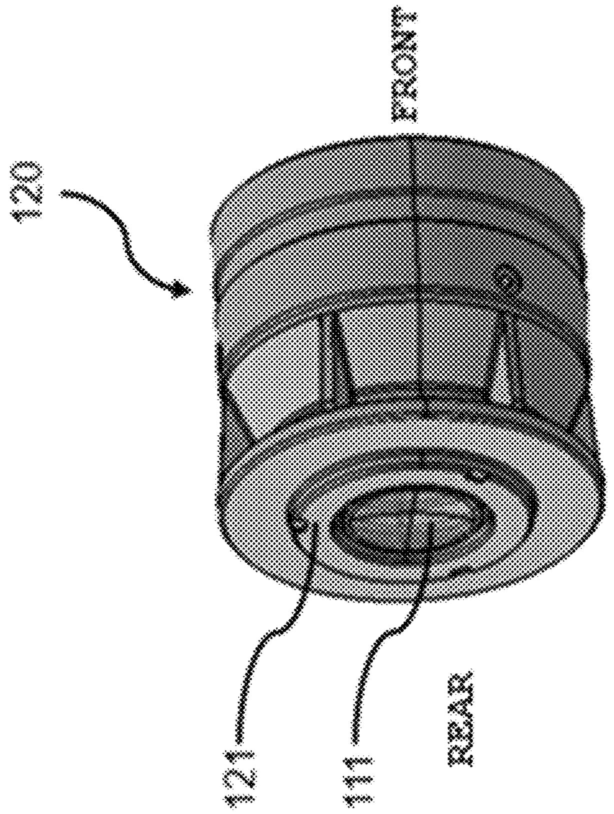
Figure 7A:
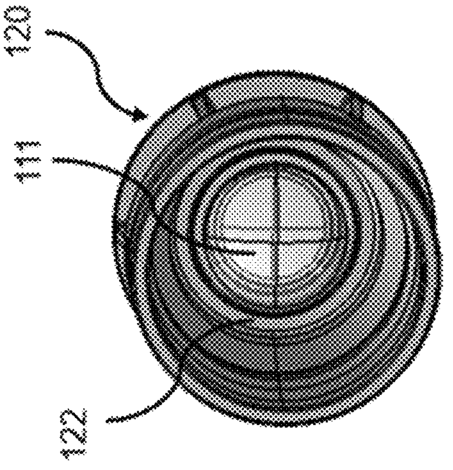
Figure 7B:
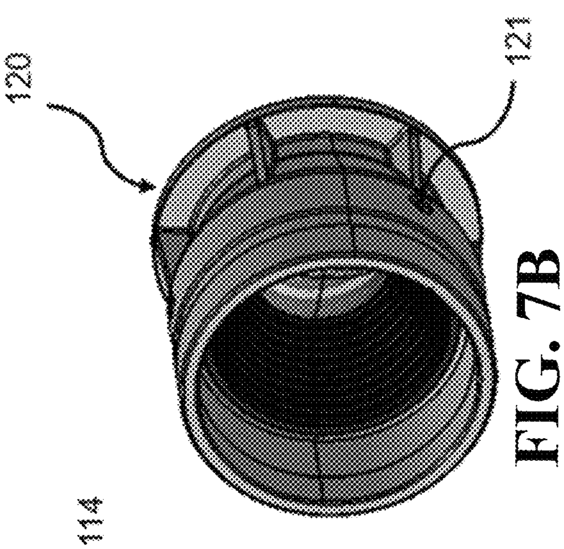
Figure 7C:
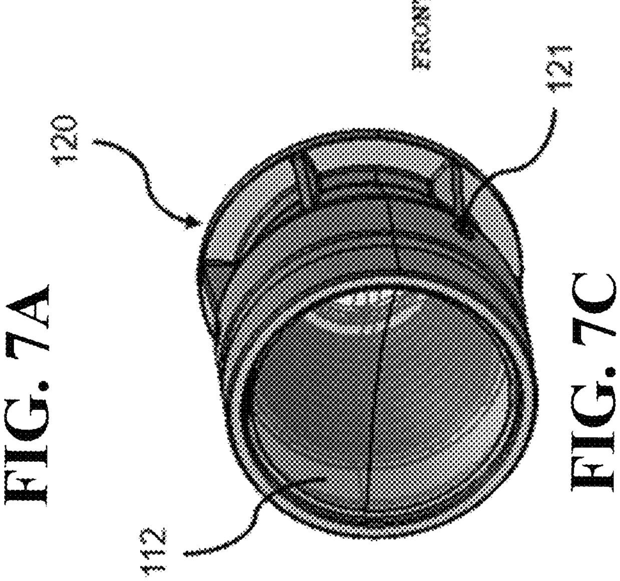
Figure 7D:
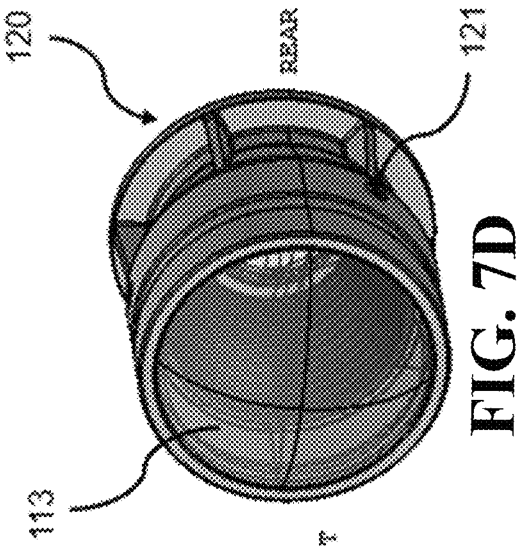
Figure 8A:
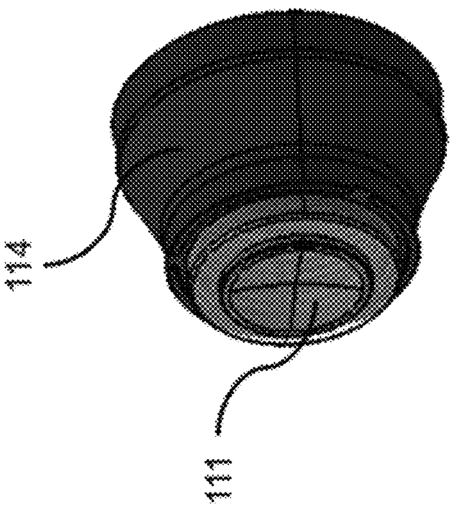
Figure 8B:
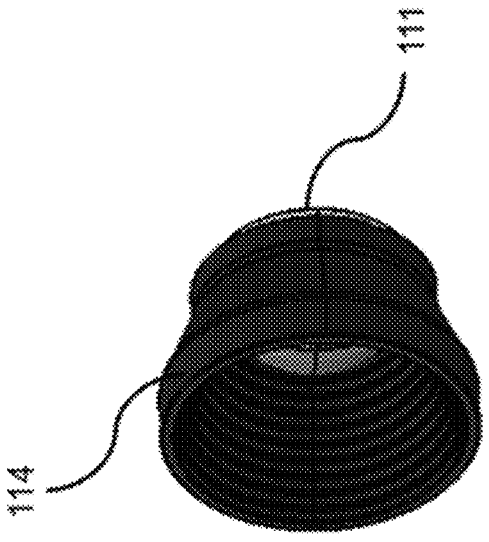
Figure 8C:
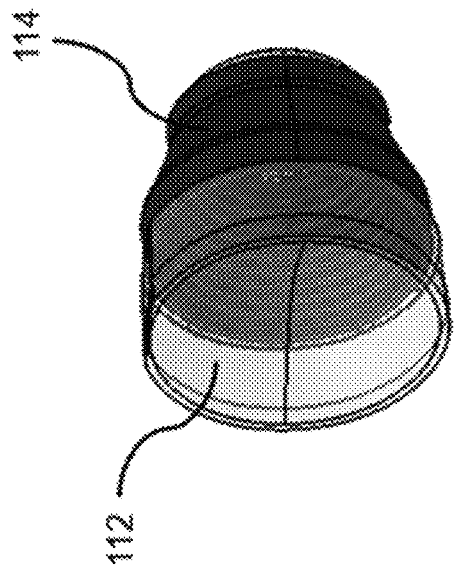
Figure 8D:
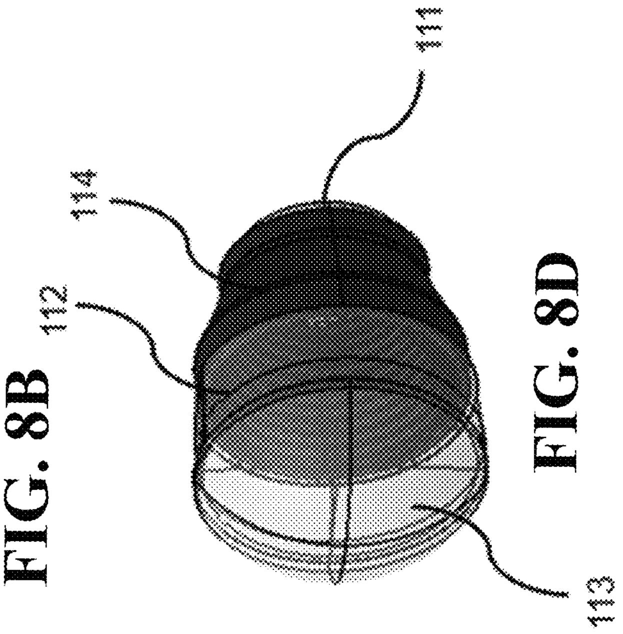

Referring to FIGS. 3 and 4, the lens assembly 100 according to an embodiment of the present disclosure may include a lens unit 110, a cam unit 120, a first barrel unit 130, a second barrel unit 140, and a front cap 150.

The lens unit 110 may include a plurality of lenses disposed along an optical axis Lx of the light source unit 210 including the light source 211. Referring to FIGS. 1-5 together, the lens unit 110 may include a first lens 111, a second lens 112, and a third lens 113. The plurality of lenses may be arranged in an order of the third lens 113, the second lens 112, and the first lens 111 from the front. The respective lenses may be assembled to the cam unit 120, the first barrel unit 130, and the second barrel unit 140 for respective lens surfaces to be arranged to maintain a set distance from the light source 211. This configuration is to implement a required high resolution by fixing the first lens 111, the second lens 112, and the third lens 113 to maintain their correct positions. The first lens 111, the second lens 112, and the third lens 113 may be arranged for the center of each lens surface to coincide with the optical axis Lx.

That is, in the lens assembly 100 according to an embodiment of the present disclosure, the plurality of lenses may be fixed in one direction to minimize assembly tolerance in order to implement the high resolution. The plurality of lenses may be fixed to be positioned in the correct position.

Referring to FIGS. 6A to 8D together, the cam unit 120 may have a cylindrical shape and accommodate the lens unit 110. The cam unit 120 may have a through hole 121 in its side surface. The cam unit 120 may have both ends open to dispose the lens unit 110 therein. The cam unit 120 may have a seat 121 formed at its one end. The first lens 111 may be accommodated in the cam unit 120 and seated on the seat 121 so that its convex lens surface faces forward.

The cam unit 120 may have a seating end 122 is formed inside its one end. The seating end 122 is a structure protruding from the inside of the one end in a circumferential direction. A spacer 114 may be positioned at the seating end 122 for the first lens 111 and the second lens 112 to be spaced apart from each other by the set distance. The spacer 114 may have a cylindrical shape, and its side surface may have a shape corresponding to that of an inner surface of the cam unit 120. The first lens 111 and second lens 112 can be spaced apart from each other by the set distance as the spacer 114 is positioned at the seating end 122 inside the cam unit 120.

The second lens 112 may be disposed at the spacer 114 so that its lens surface faces backward. The second lens 112 may have a flange 112*a* formed at its one end and positioned around the lens surface. The second lens 112 may be disposed in the cam unit 120 as the flange 112*a* is in contact with the spacer 114.

The third lens 113 may have one end in contact with an opposite side of the flange 112*a*, which is the other end of the second lens 112. The other end of the third lens 113 that forms a convex lens surface may be exposed to the outside from the other open end of the cam unit. The convex lens surface of the third lens 113 may face forward.

The front cap 150 may be coupled to one end of the cam unit 120 to fix a position of the lens unit 110. The position of the lens unit 110 may be fixed when the third lens 113 configures one end of the lens unit 110, and the front cap 150 is fixed to one end of the cam unit 120.

Figure 9:
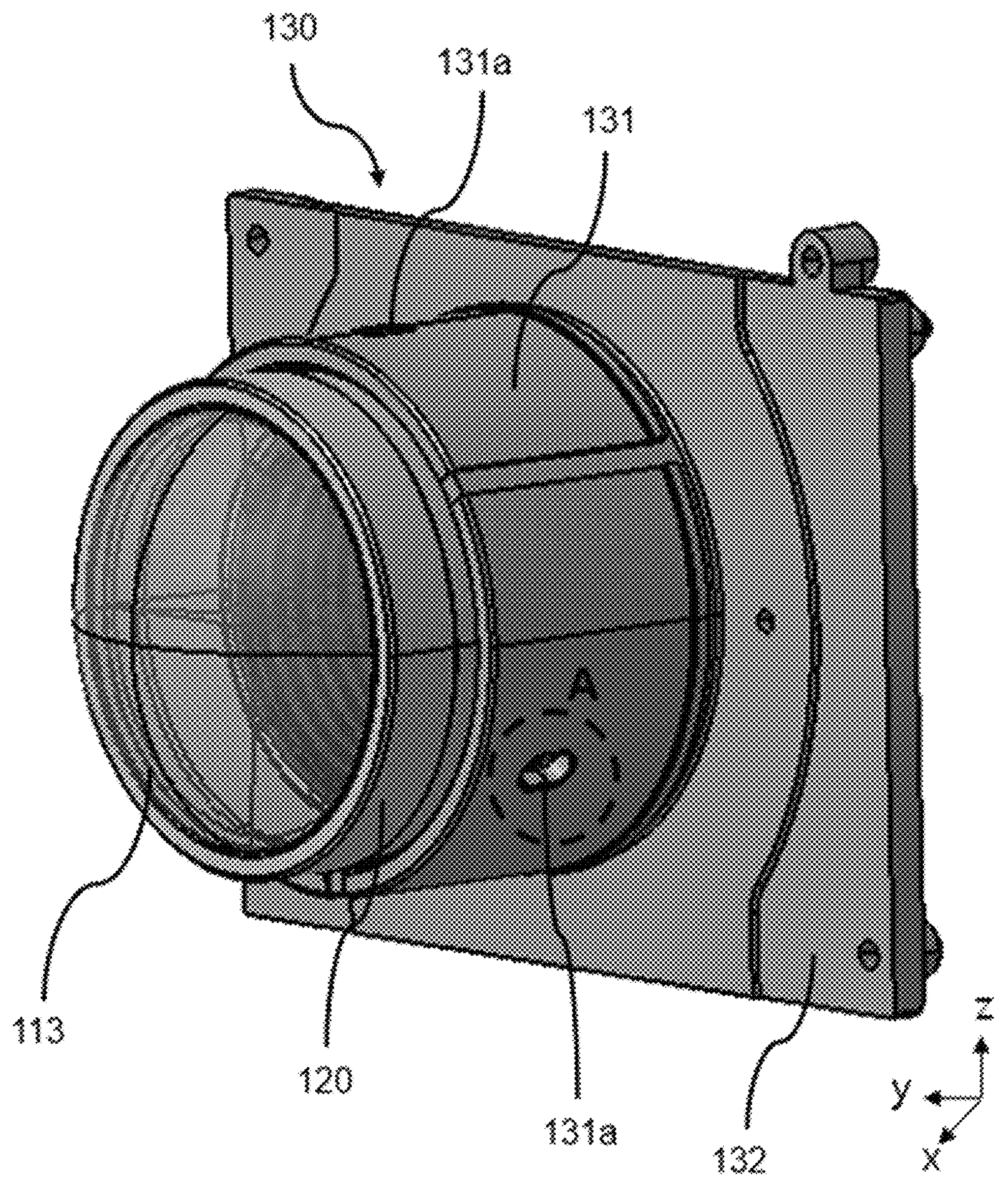
FIGS. 9 and 10 are perspective views of the lens module of FIG. 1.

Referring to FIG. 9, the first barrel unit 130 may include a first barrel 131 having a cylindrical shape and accommodating the cam unit 120 and a flange 132 positioned at one end of the first barrel 131 and coupled to the light source unit 200. The first barrel 131 may have a fixing hole 131*a* positioned in its side surface to correspond to the through hole 121.

The flange 132 may protrude radially from the side surface of the first barrel 131, and the lens assembly 100 may be coupled to the light source unit 200 through the flange 132.

Figure 10:
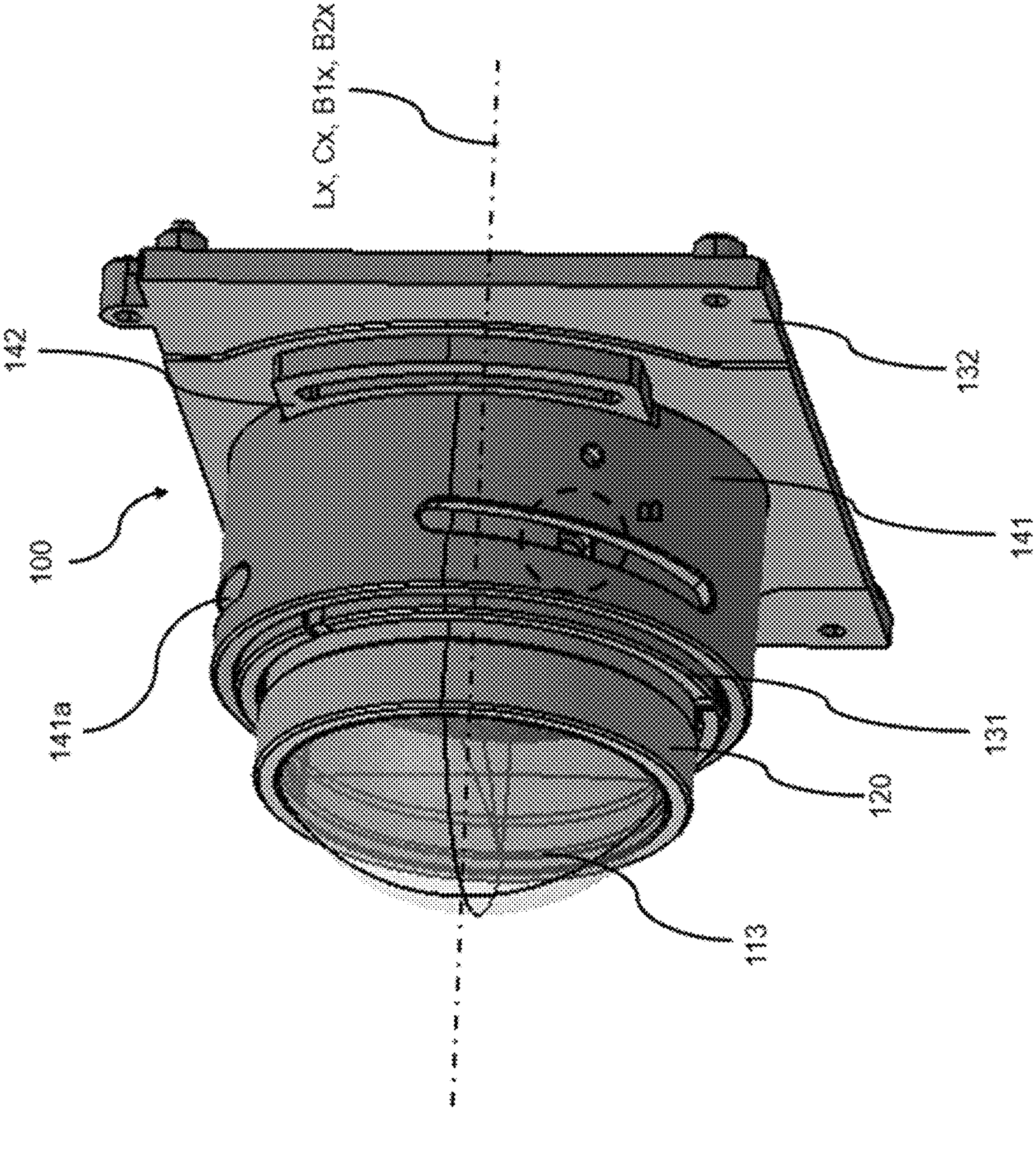

Referring to FIG. 10, the second barrel unit 140 may include a second barrel 141 having a cylindrical shape and accommodating the first barrel 131 and a coupling 142 protruding radially from an outer surface of one end of the second barrel 141.

The second barrel 141 may have a moving hole 141*a* positioned in its side surface, having a set length in an oblique direction, and corresponding to the fixing hole 131*a*. Referring to FIGS. 11-14 together, the pair of couplings 142 may be symmetrically positioned on the outer surface of the second barrel unit 140. The couplings 142 can be positioned on the left and right relative to the front. The couplings 142 may each have a coupling hole 142*a* having a set length in the circumferential direction. The coupling hole 142*a* is a component allowing the second barrel 141 to be assembled to the flange 132 of the first barrel 131. Accordingly, the second barrel unit 140 may be rotated clockwise or counterclockwise.

A central axis Cx of the cam unit that is formed by the cam unit 120, a central axis B1*x* of the first barrel that is formed by the first barrel 131, and a central axis B2*x* of the second barrel that is formed by second barrel 141 may respectively coincide with the optical axis Lx. This configuration may allow the lens unit 110 to be positioned in the correct position.

Referring to FIGS. 9 to 14 together, three through holes 121 of the cam unit 120 may be equally spaced apart from one another based on the central axis Cx of the cam unit. The through holes 121 may be spaced apart from one another by 120 degrees based on the central axis Cx of the cam unit, and can be positioned in the side surface of the cam unit 120.

Three fixing holes 131*a* of the first barrel 131 may be equally spaced apart from one another based on the central axis B1*x* of the first barrel. The fixing holes 131*a* may be spaced apart from one another by 120 degrees based on the central axis B1*x* of the first barrel, and can be positioned in the side surface of the first barrel 131.

Three moving holes 141*a* may be equally spaced apart from one another based on the central axis B2*x* of the second barrel. The moving holes 141*a* may be spaced apart from one another by 120 degrees based on the central axis B2*x* of the second barrel, and can be positioned in the side surface of the second barrel 141.

Figure 11:
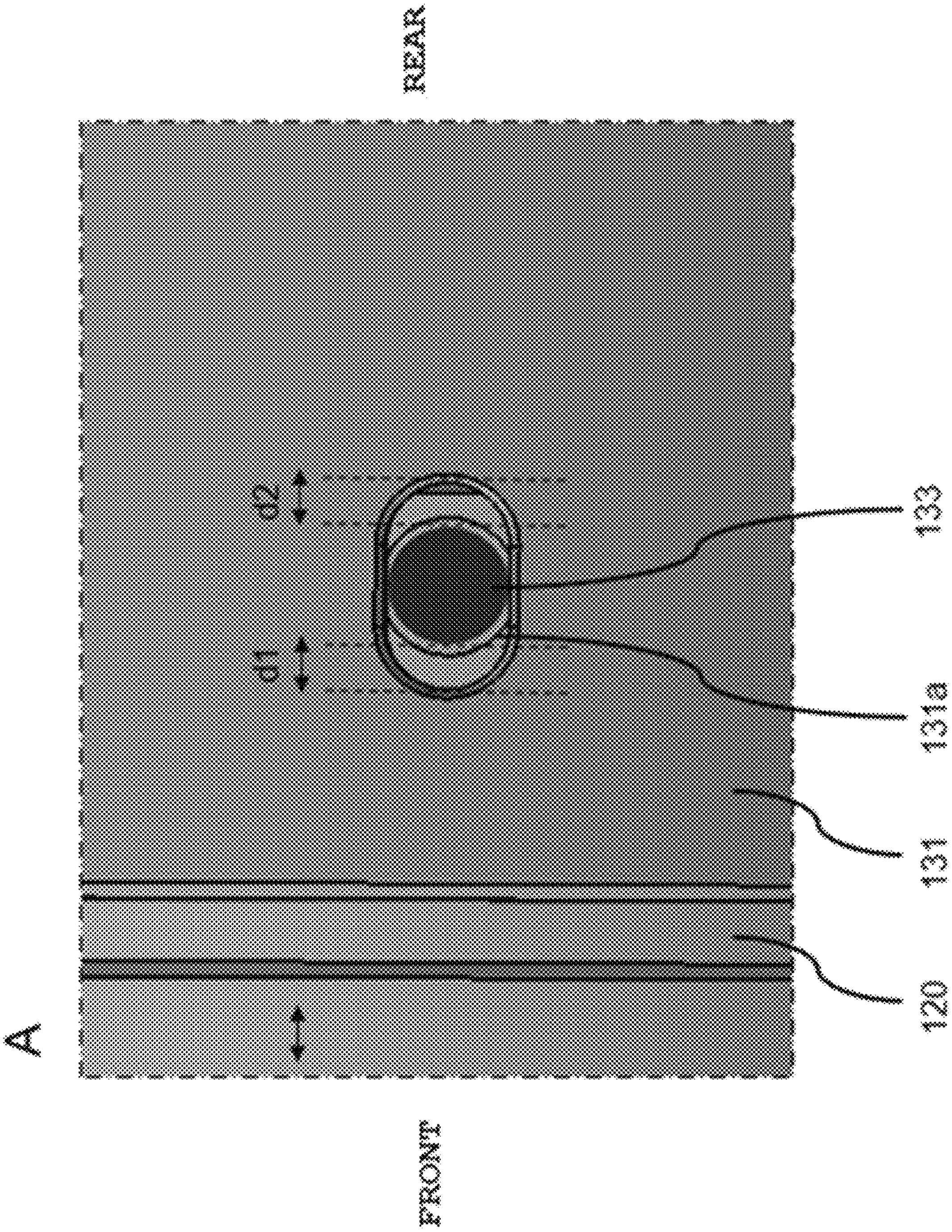
FIGS. 11 and 12 are side views of the lens module of FIG. 1.
Figure 12:
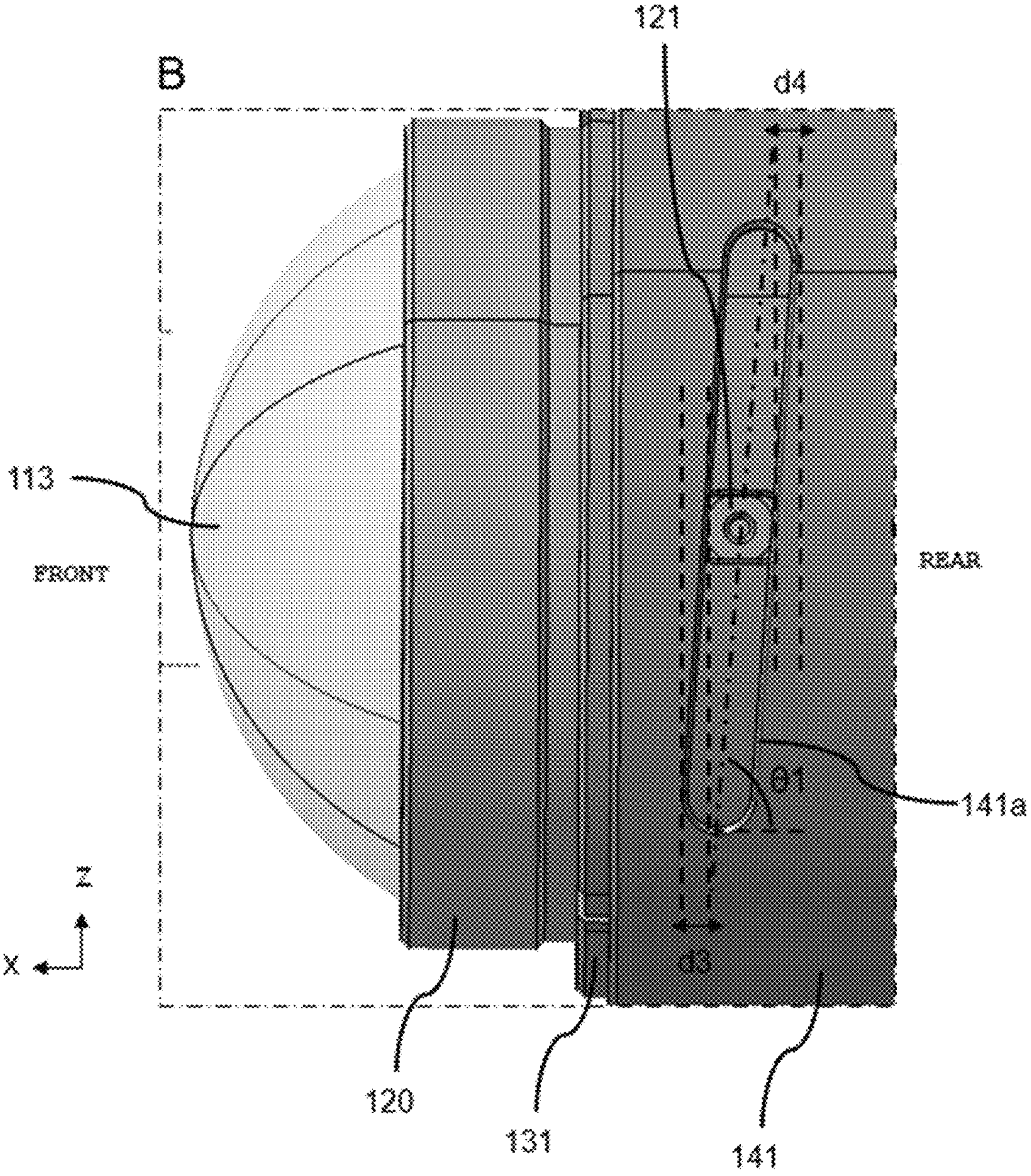

The fixing hole 131*a* may be a long hole having a predetermined length in a longitudinal direction of the first barrel 131, which is a direction parallel to the optical axis Lx. The fixing hole 131*a* may be assembled with the through hole 121 by a fixing pin 133. The cam unit 120 having the through hole 121 can be moved forward or backward. Here, the fixing hole 131*a* which is the long hole can determine a limit of a distance that the through hole 121 can be moved. Referring to FIG. 11, the through hole 121 can be moved forward and backward by the fixing hole 131*a* within a forward displacement d1 and a backward displacement d2. This configuration is to finely adjust a distance between the lens unit 110 and the light source 211. Through this configuration, it is possible to find an appropriate position of the lens unit 110 for implementing an optimal resolution.

The moving hole 141*a* may be inclined at an angle θ1 set on the side surface of the second barrel 141. The angle θ1 of the moving hole 141*a* may finely adjust the forward and backward movements of the cam unit 120 and limit the movement distance simultaneously. The angle θ1 of the moving hole 141*a* may be formed between a longitudinal direction of the moving hole 141*a* and a direction of the central axis B2*x* of the second barrel 141. The angle θ1 may be formed when the moving hole 141*a* is inclined obliquely from the side surface of the second barrel 141.

The through hole 121, the fixing hole 131*a*, and the moving hole 141*a* may be connected to one another by fastening the fixing pin 133 to the through hole 131*a*. The cam unit 120 can be moved by a distance of the cam unit 120 in a longitudinal direction that is provided while the fixing pin 133 is moved from the moving hole 141*a* in the oblique direction.

The moving hole 141*a* may have a forward movement distance d3 and a backward movement distance d4 as the moving hole 141*a* is inclined in the oblique direction. The forward movement distance d3 may be a distance between an end of the moving hole 141*a* that faces forward and a point where the center line of the moving hole 141*a* meets the end of the moving hole 141*a* that faces forward, and the backward movement distance d4 may be a distance between an end of the moving hole 141*a* that faces backward and a point where the center line of the moving hole 141*a* meets the end of the moving hole 141*a* that faces backward.

The cam unit 120 can be moved forward or backward by the distance of the forward movement distance d3 or the backward movement distance d4 by rotation of the second barrel 141.

The angle θ1 of the moving hole 141*a* positioned in the moving hole 141*a* may control the forward and backward movement of the second barrel 141 in the x-axis direction. The movement of the second barrel can be finely adjusted based on a degree of the angle θ1 of the moving hole 141*a*. The angle θ1 of the moving hole 141*a* may be 45 degrees or more.

The forward movement distance d3 and the forward displacement d1 may have the same distance, and the backward movement distance d4 and the backward displacement d2 may have the same distance, based on the angle θ1 of the moving hole 141*a*.

Figure 13:
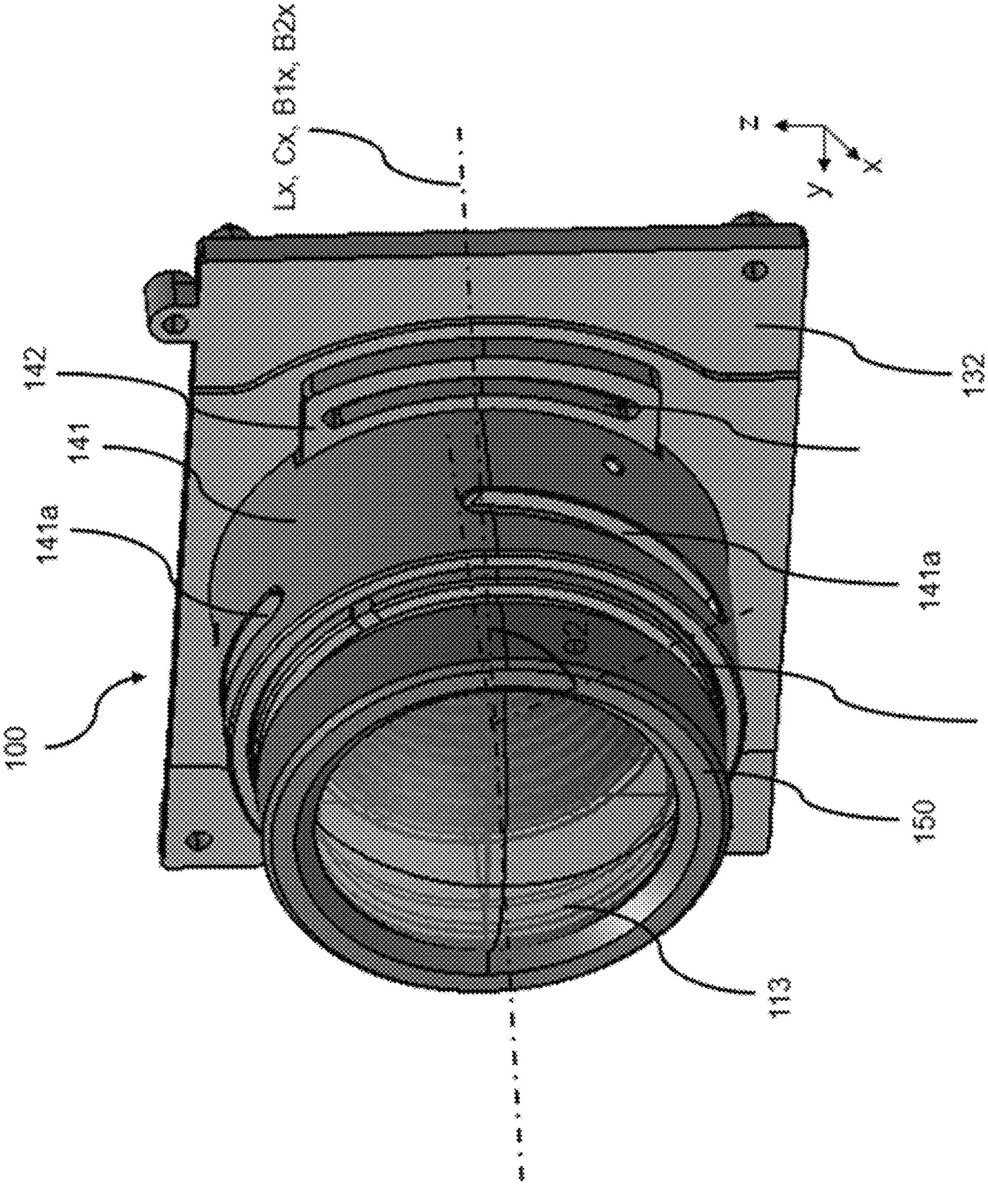
FIG. 13 is a perspective view of the lens unit in the lens assembly according to an embodiment of the present disclosure.
Figure 14:
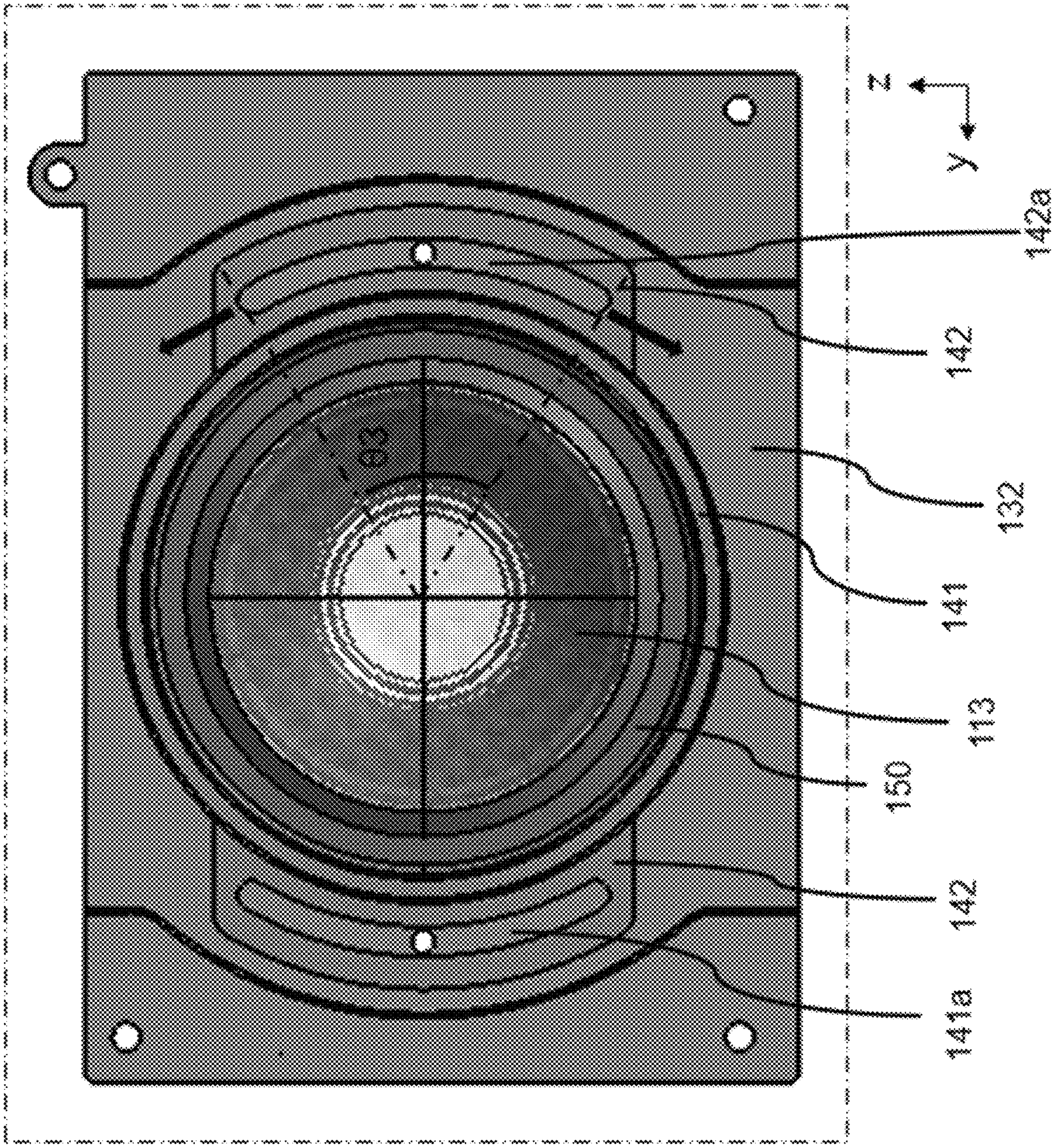
FIG. 14 is a front view of the lens unit in the lens assembly according to an embodiment of the present disclosure.

Referring to FIGS. 13 and 14, an angle θ2 formed between both ends of the moving hole 141*a* and the central axis B2*x* of the second barrel may be less than or equal to an angle θ3 formed between both ends of the coupling hole 142*a* and the central axis B2*x* of the second barrel. The reason is that rotation of the coupling 142 needs to include a rotational displacement of the second barrel 141.

As set forth above, the lens assembly according to the present disclosure may fix each of the plurality of lenses in the appropriate position to maintain the appropriate distance between the light source and the lens, thereby acquiring the resolution required by the 100-pixel level high-resolution ADB lamp.

In addition, the lens assembly according to the present disclosure can be moved in the X-axis direction while fixing the central axis of the lens to find the appropriate mounting position of the lens, and it is thus possible to find the appropriate position of the lens unit during light distribution inspection.

In addition, the lens assembly according to the present disclosure can have a lower defect rate by having the required resolution through the simple light distribution inspection on the assembly line after matching the appropriate distance between the light source and the lens.

In addition, the lens assembly according to the present disclosure can lower a unit price of the product by using the plurality of lenses, and lowering the defect rate by performing the light distribution inspection on the expensive glass lenses.

The embodiments of the disclosure have been described above for illustrative purposes, and those skilled in the art to which the present disclosure pertains will appreciate that various modification and other equivalent embodiments are possible therefrom. Therefore, those skilled in the art will fully understand that the present disclosure is not limited to the specific embodiments described in the detailed description above. Thus, the true technical scope of the present disclosure should be defined by the technical spirit of the appended claims. In addition, it is to be understood that the present disclosure includes all modifications, equivalents, and substitutes within the spirit and scope of the present disclosure as defined by the appended claims.

What is claimed is:

1. A lens assembly comprising:

a lens unit including a plurality of lenses arranged along an optical axis of a light source unit comprising a light source;

a cam unit having a cylindrical shape, accommodating the lens unit, and having a through hole in a side surface thereof;

a first barrel unit including a first barrel having a cylindrical shape, accommodating the cam unit, and having a fixing hole positioned in a side surface of the first barrel to correspond to the through hole, and a flange positioned at one end of the first barrel and coupled to the light source unit; and a second barrel unit including:

a second barrel having a cylindrical shape, accommodating the first barrel, and having a moving hole positioned in a side surface of the second barrel to correspond to the fixing hole, the moving hole having a prescribed length in an oblique direction, and a coupling protruding radially from an outer surface of one end of the second barrel with which to rotate the second barrel.

2. The lens assembly of claim 1, further comprising a front cap coupled to one end of the cam unit to fix the lens unit to the cam unit.

3. The lens assembly of claim 1, wherein the lens unit includes a first lens positioned on a seat formed at a first open end of the cam unit;

a spacer positioned at the open end of the cam unit to separate the first lens and a second lens apart from each other by a prescribed distance;

the second lens having an end in contact with the spacer; and a third lens having a first end in contact with the second lens and a second end which is a convex lens surface and exposed through a second opposite open end of the cam unit.

4. The lens assembly of claim 1, wherein three through holes are spaced apart from one equally another along a central axis of the cam unit, three fixing holes are spaced apart from one another equally along a central axis of the first barrel, and three moving holes are spaced apart from one another equally along a central axis of the second barrel.

5. The lens assembly of claim 4, wherein the central axis of the cam unit, the central axis of the first barrel, and the central axis of the second barrel coincide respectively with the optical axis.

6. The lens assembly of claim 4, wherein the fixing hole is a long hole having a predetermined length in a longitudinal direction of the first barrel, which is a direction parallel to the optical axis.

7. The lens assembly of claim 6, wherein the moving hole is inclined obliquely from the side surface of the second barrel while having an angle between a longitudinal direction of the moving hole and a direction of the central axis of the second barrel.

8. The lens assembly of claim 7, wherein the through hole, the fixing hole, and the moving hole are connected to one another by a fixing pin fastened at the through hole, and the cam unit is moved in a longitudinal direction when the fixing pin is moved obliquely from the moving hole.

9. The lens assembly of claim 1, wherein the coupling comprises a pair of couplings that are symmetrically positioned, and each of the couplings has a coupling hole having a prescribed length in a circumferential direction.

10. The lens assembly of claim 9, wherein an angle formed between both ends of the moving hole and the central axis of the second barrel is less than or equal to an angle formed between both ends of the coupling hole and the central axis of the second barrel.

* * * * *